Patented Aug. 18, 1953

2,649,479

UNITED STATES PATENT OFFICE 2,649,479

PROCESS FOR THE MANUFACTURE OF NITRO - AMINO - HYDROXYBENZENE-SULFONIC ACID AMIDES

Christian Zickendraht, Binningen, Switzerland, assignor to Ciba Limited, Basel, Switzerland, a Swiss firm No Drawing. Application February 4, 1952, Serial No. 269,904. In Switzerland February 22, 1951

5 Claims. (Cl. 260—556)

This invention provides valuable new intermediate products, which are made by treating a 2:4-dinitro-1-halogen-benzene-6-sulfonic acid amide with an alkaline earth metal hydroxide, and reducing the nitro group in the 2-position of the resulting 2:4 - dinitro - 1 - hydroxy - benzene - 6-sulfonic acid amide to an amino group.

The 2:4-dinitro-1-halogen-benzene-6-sulfonic acid amides used as starting materials are also new compounds, and can be made by reacting a 2:4-dinitro-1-halogen-benzene-6-sulfonic acid halide, such as 2:4-dinitro-1-bromobenzene-6-sulfonic acid bromide or 2:4-dinitro-1-bromobenzene-6-sulfonic acid chloride and especially 2:4-dinitro-1-chlorobenzene-6-sulfonic acid chloride, with ammonia or an organic amine, for example, an alkyl, cycloalkyl, aralkyl, aryl or heterocyclic amine, such as methylamine, ethylamine or butylamine, cyclohexylamine, benzylamine, and also aminobenzenes such as aniline or methyl anilines, amino-naphthalenes or morpholine. The 2:4 - dinitro - 1 - halogen - benzene - 6 - sulfonic acid halides can be made by treating the corresponding 2:4-dinitro-1-halogen-benzene-6-sulfonic acids with an agent known for converting sulfonic acids into their acid halides such, for example, as phosphorus tribromide, phosphorus pentachloride and phosphorus oxychloride, and especially good results are obtained in the present case with chlorosulfonic acid. The reaction of the 2:4 - dinitro - 1 - halogen - benzene - 6 - sulfonic acid halides so obtained with the abovementioned amines is advantageously carried out in an aqueous medium, if desired, in the presence of an agent capable of binding the resulting hydrohalic acid. Instead of the amines there may be used their salts, especially their hydrohalides such as their hydrochlorides, in which case the amine necessary for the reaction with the 2:4 - dinitro - 1 - halogen - benzene - 6 - sulfonic acid halide is continually liberated in the reaction mixture by means of an alkali, for example, by means of caustic soda solution or sodium carbonate.

The exchange of the halogen atom present in the 1-position of the resulting amide for a hydroxyl group is carried out in accordance with the invention by means of an alkaline earth metal hydroxide such, for example, as barium hydroxide and especially calcium hydroxide, at a raised temperature, advantageously at the boiling temperature of the reaction mixture.

The nitro group bound in the 2-position of the resulting 2:4 - dinitro - 1 - hydroxy - benzene-6-sulfonic acid amides is reduced to an amino group by methods in themselves known. This is carried out without reduction of the nitro group in the 4-position, for example, by means of an alkali hydrosulfide such as sodium hydrosulfide, or an alkaline earth metal hydrosulfide such as calcium hydrosulfide or magnesium hydrosulfide. The 4 - nitro - 2 - amino - 1 - hydroxy - benzene-6-sulfonic acid amides thus obtainable are valuable new compounds which are suitable, for example, as intermediate products for the manufacture of dyestuffs.

The following examples illustrate the invention, the parts and percentages being by weight.

Example 1

305 parts of sodium 2:4-dinitro-1-chlorobenzene-6-sulfonate are introduced in small portions into 1200 parts of chlorosulfonic acid, while stirring, at room temperature, and the whole is heated for 4 hours at 150–155° C. When the reaction mass has cooled, it is poured on to 3000 parts of ice and filtered to separate the precipitated 2:4 - dinitro - 1 - chlorobenzene - 6 - sulfonic acid chloride (melting at 104–106° C. after recrystallization from ether). The moist paste obtained after washing the product with ice water until neutral, is stirred with 200 parts of water and 300 parts of ice, and 225 parts of ammonia solution of 25 per cent strength are added dropwise in the course of one hour. The whole is then stirred for a few hours longer, and is finally acidified with hydrochloric acid and filtered. The resulting filter cake of 2:4-dinitro-1-chlorobenzene-6-sulfonic acid amide (melting at 188–190° C. after recrystallization from acetic acid) is introduced into a partial solution or suspension of 185 parts of calcium hydroxide in 800 parts of water, and the whole is heated for 4 hours under reflux. The mixture is then acidified with hydrochloric acid, and the precipitated 2:4-dinitro-1-hydroxy-benzene-6-sulfonic acid amide (melting at 231–232° C. after recrystallization from acetic acid) is separated by filtering with suction. The product is dissolved at 30° C. in 200 parts of water and 50 parts of sodium hydroxide solution of 30% strength, and after the addition of a solution of 80 parts of sodium hydrosulfide in 100 parts of water the whole is stirred for one hour, during which the temperature rises to 60° C. After acidification with hydrochloric acid, the resulting 4 - nitro - 2 - amino - 1 - hydroxy - benzene - 6-sulfonic acid amide is separated by filtration. When dry it is a yellow-brown powder which can be purified by dissolution in an aqueous solution of sodium carbonate and acidification and melts at 201° C. with decomposition. It is distinguished from 4-nitro-2-amino-1-hydroxy-benzene-6-sulfonic acid principally by the fact that it forms a diazo-compound which is sparingly soluble in water.

By the condensation of 2:4-dinitro-1-chlorobenzene-6-sulfonic acid chloride with methylamide in the same manner there is obtained 2:4-dinitro-1-chlorobenzene-6-sulfonic acid methylamide which upon hydrolysis and partial reduction yields 4-nitro-2-amino-1-hydroxy-benzene-6-sulfonic acid methylamide in the form of a yellow-brown powder melting at 159–161° C.

*Example 2*

93 parts of aminobenzene are suspended in 300 parts of ice and dissolved by the addition of 117 parts of hydrochloric acid of 30 per cent. strength. 301 parts of 2:4-dinitro-1-chlorobenzene-6-sulfonic acid chloride are added to the solution and about 260 parts of sodium hydroxide solution of 30 per cent. strength are introduced dropwise in such manner that the medium is maintained neutral to slightly alkaline to Brilliant yellow. The temperature is maintained between 0° and 5° C. by the addition of ice. The resulting yellow magma consisting of 2:4-dinitro-1-chlorobenzene-6-sulfonic acid anilide (melting at 238–240° C. after recrystallization from glacial acetic acid) is separated by filtration, and the moist filter cake is introduced into a partial solution or suspension of 185 parts of calcium hydroxide in 800 parts of water and the whole is heated under reflux for 4 hours. After acidifying the mixture with hydrochloric acid, the precipitated product is separated by filtering with suction, and dissolved in 200 parts of water and 50 parts of sodium hydroxide solution of 30 per cent. strength. After the addition of a solution of 80 parts of sodium hydrosulfide in 100 parts of water the whole is stirred for one hour at 50–70° C. The product is worked up in the manner described in Example 1. The 4-nitro-2-amino-1-hydroxy-benzene-6-sulfonic acid anilide so obtained can be converted by diazotization into a sparingly soluble diazocompound that couples very well.

The same result is obtained by using calcium hydrosulfide instead of sodium hydrosulfide.

What is claimed is:

1. A process for the manufacture of a nitro-amino-hydroxybenzene-sulfonic acid amide which comprises heating one mol of a member selected from the group consisting of 2:4-dinitro-1-chlorobenzene-6-sulfonic acid amide, 2:4-dinitro-1-chlorobenzene-6-sulfonic acid methyl-amide and 2:4-dinitro-1-chlorobenzene-6-sulfonic acid phenyl-amide with at least two mols of an alkaline earth metal hydroxide, and reducing the nitro group bound in the 2-position of the resulting product to an amino group by means of a reducing agent selected from the group consisting of alkali and alkaline earth metal hydrosulfides.

2. A process for the manufacture of a nitro-amino-hydroxybenzene-sulfonic acid amide which comprises heating one mol of 2:4-dinitro-1-chlorobenzene-6-sulfonic acid amide with at least two mols of aqueous calcium hydroxide at the boiling temperature of the reaction mixture, and reducing to an amino group the nitro group bound in 2-position of the resulting 2:4-dinitro-1-hydroxybenzene-6-sulfonic acid amide by means of calcium hydrosulfide.

3. A process which comprises heating one mol of 2:4-dinitro-1-chlorobenzene-6-sulfonic acid methylamide with at least two mols of aqueous calcium hydroxide at the boiling temperature of the reaction mixture, and reducing to an amino group the nitro group bound in 2-position of the resulting 2:4-dinitro-1-hydroxybenzene-6-sulfonic acid methyl amide by means of aqueous sodium hydrosulfide.

4. A process which comprises heating one mol of the 2:4-dinitro-1-chlorobenzene-6-sulfonic acid phenylamide with at least two mols of aqueous calcium hydroxide at the boiling temperature of the reaction mixture, and reducing to an amino group the nitro group bound in 2-position of the resulting 2:4-dinitro-1-hydroxybenzene-6-sulfonic acid phenyl amide by means of aqueous sodium hydrosulfide.

5. A process which comprises heating one mol of the 2:4-dinitro-1-chlorobenzene-6-sulfonic acid amide with at least two mols of aqueous calcium hydroxide at the boiling temperature of the reaction mixture, and reducing to an amino group the nitro group bound in 2-position of the resulting 2:4-dinitro-1-hydroxy-benzene-6-sulfonic acid amide by means of aqueous sodium hydrosulfide.

CHRISTIAN ZICKENDRAHT.

References Cited in the file of this patent

UNITED STATES PATENTS

| Number | Name | Date |
|---|---|---|
| 2,024,864 | Kopp et al. | Dec. 17, 1935 |
| 2,390,113 | McNally et al. | Dec. 4, 1945 |
| 2,408,961 | Straub et al. | Oct. 8, 1946 |
| 2,499,133 | Conrad et al. | Feb. 28, 1950 |

FOREIGN PATENTS

| Number | Country | Date |
|---|---|---|
| 488,792 | France | July 22, 1918 |
| 252,280 | Switzerland | Sept. 16, 1948 |